(12) United States Patent
Kojima

(10) Patent No.: US 6,471,863 B2
(45) Date of Patent: Oct. 29, 2002

(54) FILTERING DEVICE

(75) Inventor: Takeshi Kojima, Kanagawa-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/935,736

(22) Filed: Aug. 24, 2001

(65) Prior Publication Data

US 2002/0023418 A1 Feb. 28, 2002

(30) Foreign Application Priority Data

Aug. 25, 2000 (JP) ........................................ 2000-255983

(51) Int. Cl.⁷ ..................... B01D 27/08; B01D 29/15; B01D 35/027
(52) U.S. Cl. .................... 210/416.4; 210/460; 210/461; 210/232
(58) Field of Search ........................ 210/416.1, 416.4, 210/459, 460, 461, 463, 232

(56) References Cited

U.S. PATENT DOCUMENTS

| 4,312,753 | A | * | 1/1982 | Bell |
| 4,783,260 | A |   | 11/1988 | Kurihara |
| 5,049,271 | A | * | 9/1991 | Cain |
| 5,547,568 | A |   | 8/1996 | Sasaki |
| 5,584,988 | A | * | 12/1996 | Hashimoto et al. |
| 5,665,229 | A |   | 9/1997 | Fitzpatrick |
| 5,795,468 | A | * | 8/1998 | Reising et al. |
| 6,220,454 | B1 | * | 4/2001 | Chilton |

FOREIGN PATENT DOCUMENTS

JP  2515061  8/1996

* cited by examiner

Primary Examiner—David A. Simmons
Assistant Examiner—Fred Prince
(74) Attorney, Agent, or Firm—Kanesaka & Takeuchi

(57) ABSTRACT

A filtering device includes a bag member formed of a mesh member and having side edges, and a connecting port to be connected to a suction port of a pump. The connecting port is positioned at one of the side edges of the bag member. A shape holder for holding a shape of the bag member may be provided inside the bag member.

5 Claims, 6 Drawing Sheets

FILTERING DEVICE

BACKGROUND OF THE INVENTION AND RELATED ART STATEMENT

The invention relates to a filtering device, in particular, a filtering device to be directly connected to a suction port of a pump.

A suction port of a fuel pump for an internal combustion engine is provided with a filtering device for preventing foreign materials in a fuel tank from being sucked. The filtering device includes a flat-type bag member with fine mesh made of nylon, resin fibers and so on, a pump connecting port projecting from an outer surface of the bag member, and an elastic shape holder wrapped in the bag member. Heretofore, the pump connecting port has generally been positioned at a central portion of the bag member.

However, in order to fix the pump connecting port integrally connected to the bag member with the suction port of the fuel pump, a retaining ring, such as a toothed lock washer, may be attached. In this case, it has been required to provide a space for inserting therein a jig for attaching the retaining ring between an upper surface of the bag member and a retaining ring attaching portion. Therefore, in order to make the filtering device compact, although the filtering device itself has been made extremely thin, it has been difficult to reduce a dimension in the pump connecting state.

On the other hand, connection of the bag member, the pump connecting port and the elastic shape holder has been generally carried out by an ultrasonic welding apparatus in a state wherein the bag member is sandwiched between the elastic shape holder and the pump connecting port, which results in an expensive equipment cost.

In view of the above defects, the present invention has been made and an object of the invention is to provide a filtering device, wherein a dimension in a pump connecting state of the filtering device can be greatly reduced.

Another object of the invention is to provide a filtering device as stated above, wherein the production equipment can be simplified.

Further objects and advantages of the invention will be apparent from the following description of the invention.

SUMMARY OF THE INVENTION

In order to attain the above objects, according to a first aspect of the invention, in a filtering device including a bag member formed of a mesh member provided with a connecting port with respect to a suction port of a pump, the connecting port is positioned at one side edge of the bag member. Thus, a space corresponding to the height of the bag member located lower than the pump connecting port can be effectively used.

According to a second aspect of the invention, in addition to the structure of the first aspect, a shape holder for holding a shape of the bag member is located in the bag member. A shape holder fixing portion integrally formed with the connecting port is provided inside the bag member, and the shape holder and the shape holder fixing portion are integrally connected through press-in fitting of projections and holes. Thus, without using the welding equipment, the shape holder is attached to the fixing portion only through the simple manual works.

According to a third aspect of the invention, in addition to the structure of the second aspect, the mesh member and the connecting port are integrally connected by an insert molding. The shape holder is connected to the connecting port, and the mesh member is folded so that the shape holder is wrapped. Then, three opening ends of the mesh member are welded. Thus, the mesh member and the connecting port can be positively and easily connected.

DETAILED DESCRIPTION OF PREFERRED EMBODIMENT

Figure 1:
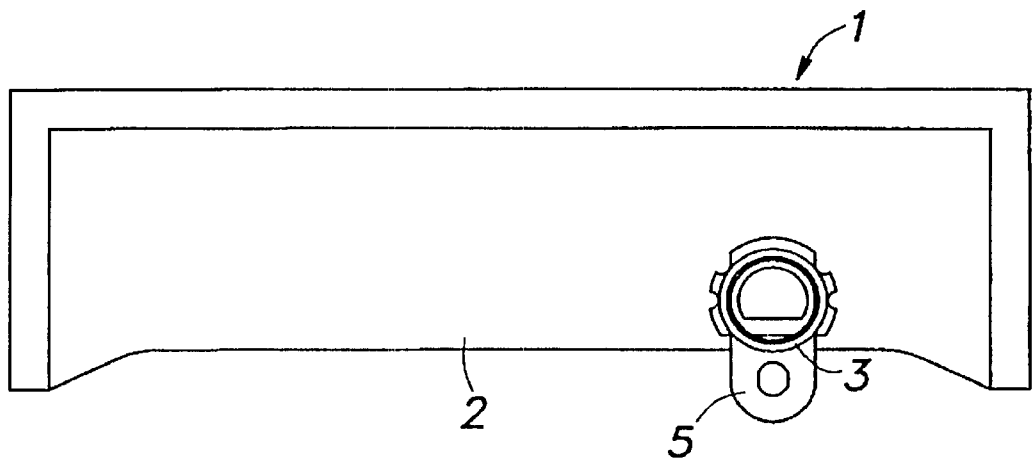
FIG. 1 is a plan view of a filtering device according to the invention.
Figure 2:
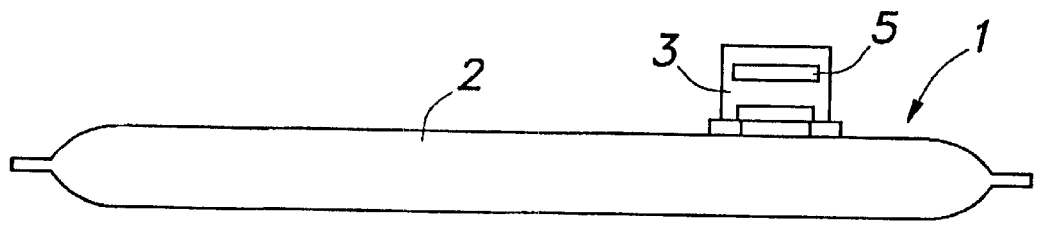
FIG. 2 is a front view of the filtering device according to the invention.
Figure 3:
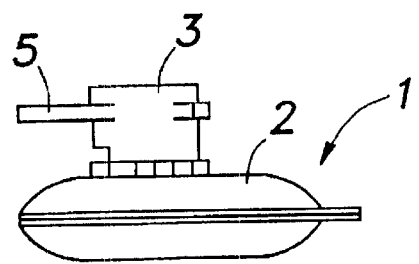
FIG. 3 is a right side view of the filtering device according to the invention.
Figure 4:
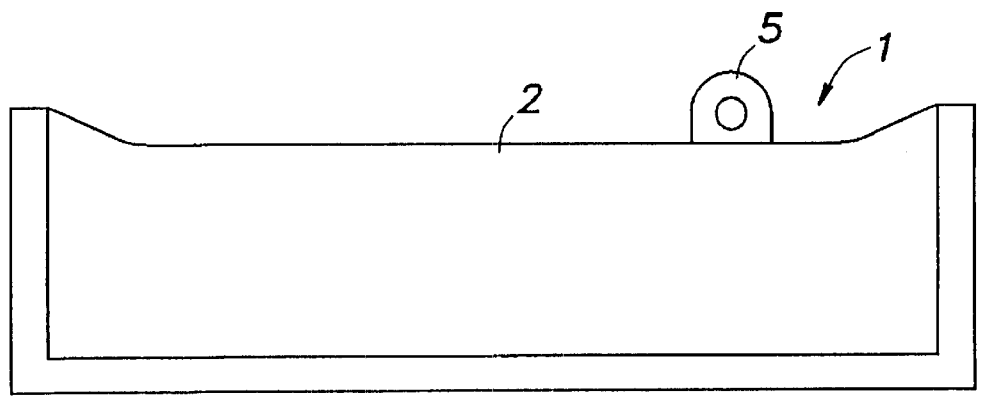
FIG. 4 is a bottom view of the filtering device according to the invention.
Figure 5:
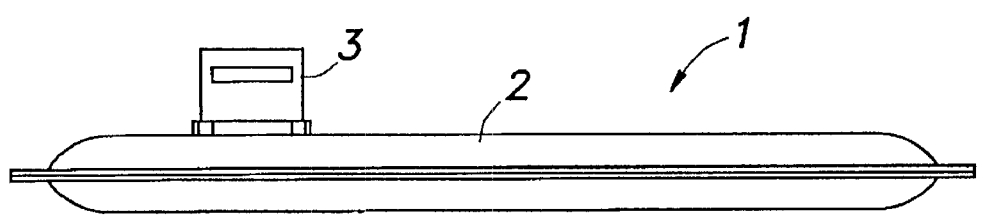
FIG. 5 is a rear view of the filtering device according to the invention.
Figure 6:
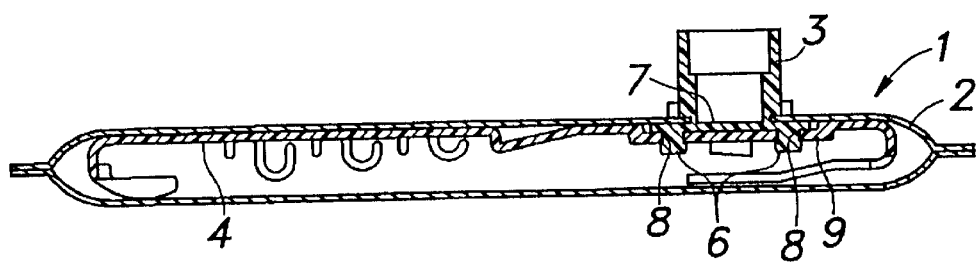
FIG. 6 is a longitudinal sectional view of the filtering device according to the invention.

Hereunder, the present invention is explained in detail with reference to the accompanying drawings.

FIGS. 1 through 6 show a filtering device to be attached to a fuel pump of an automobile engine, structured according to the invention. A filtering device 1 includes a flat-type bag member 2, a pump connecting port 3 projecting from an outer surface of the bag member 2, and an elastic shape holder 4 retained in the bag member 2. Incidentally, a flange 5 for connecting a positioning pin of a pump P, described later, is provided to the pump connecting port 3.

The bag member 2 and the pump connecting port 3 are formed such that after a mesh member made of nylon, resin fibers and so on is spread in a mold in a flat state, the pump connecting port 3 is formed by an injection molding, what is called, an insert molding method to thereby integrally connect them together. At a portion integrally formed with the pump connecting port 3 located inside the bag member 2, a fixing base 7 provided with two projections 6 having wide diameter portions at forward ends thereof is formed.

On the other hand, the elastic shape holder 4 is made of an elastic synthetic resin having a certain rigidity to hold a volume of the bag member 2, not to be crushed by a pressure at a time of fuel suction and to be properly bent when an outer force is applied thereto. A connecting portion 9 having holes 8 corresponding to the projections 6 is formed to a proper portion of the elastic shape holder 4.

Figure 7:
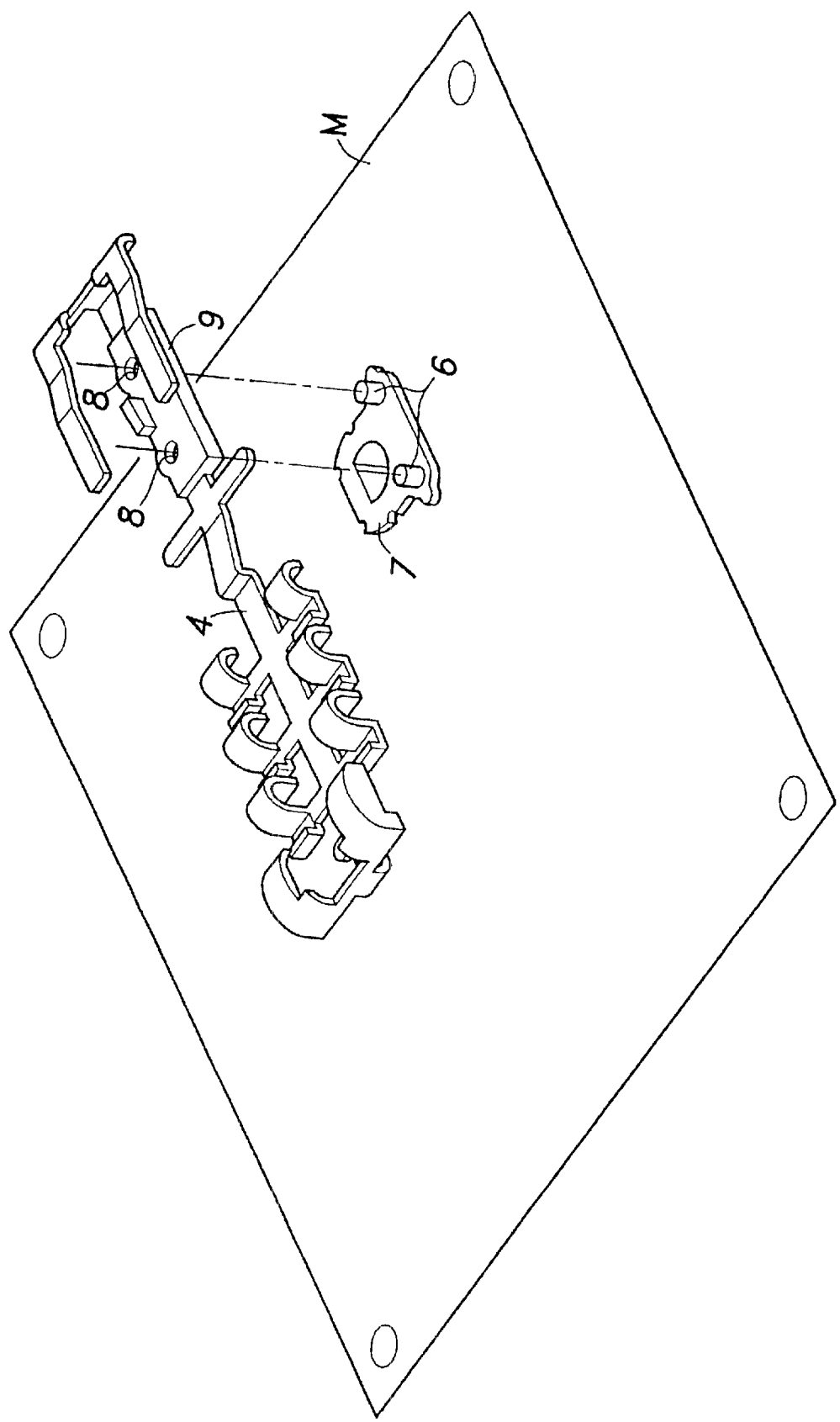
FIG. 7 is an explanatory view showing a first stage of assembling procedures of the filtering device according to the invention.

In the filtering device 1 having the above structure, first, as shown in FIG. 7, the projections 6 of the fixing base 7 are inserted into the holes 8 of the connecting portion 9 of the elastic shape holder 4, and the connecting portion 9 of the elastic shape holder 4 is pressed against the fixing base 7.

Thus, the wide diameter ends of the respective projections 6 are caught by the openings of the holes 8, so that the elastic shape holder 4 is fixed to the fixing base 7 formed integrally with the pump connecting port 3. A series of the works can only be carried out manually.

Figure 8:
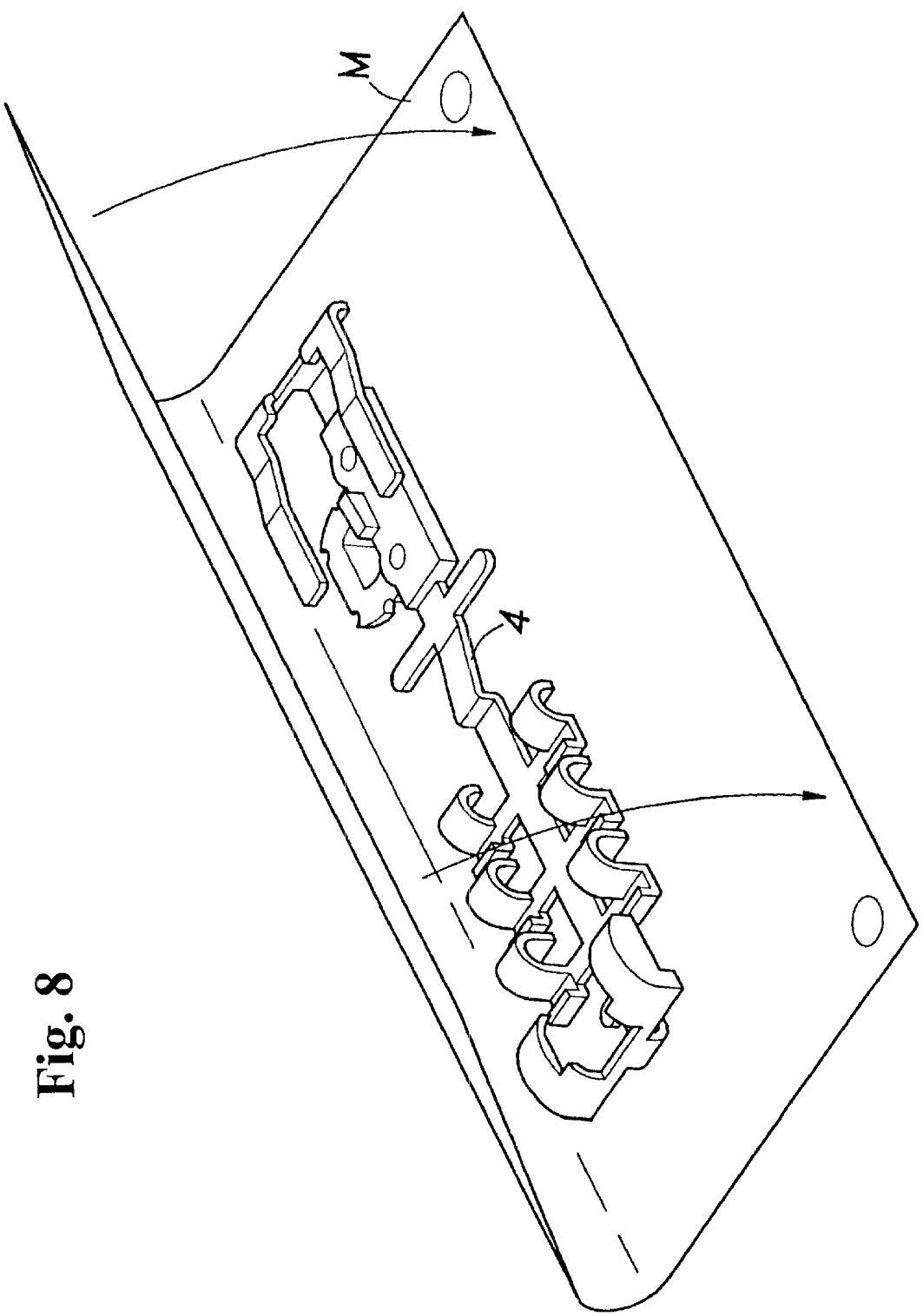
FIG. 8 is an explanatory view showing a second stage of the assembling procedures of the filtering device according to the invention.
Figure 9:
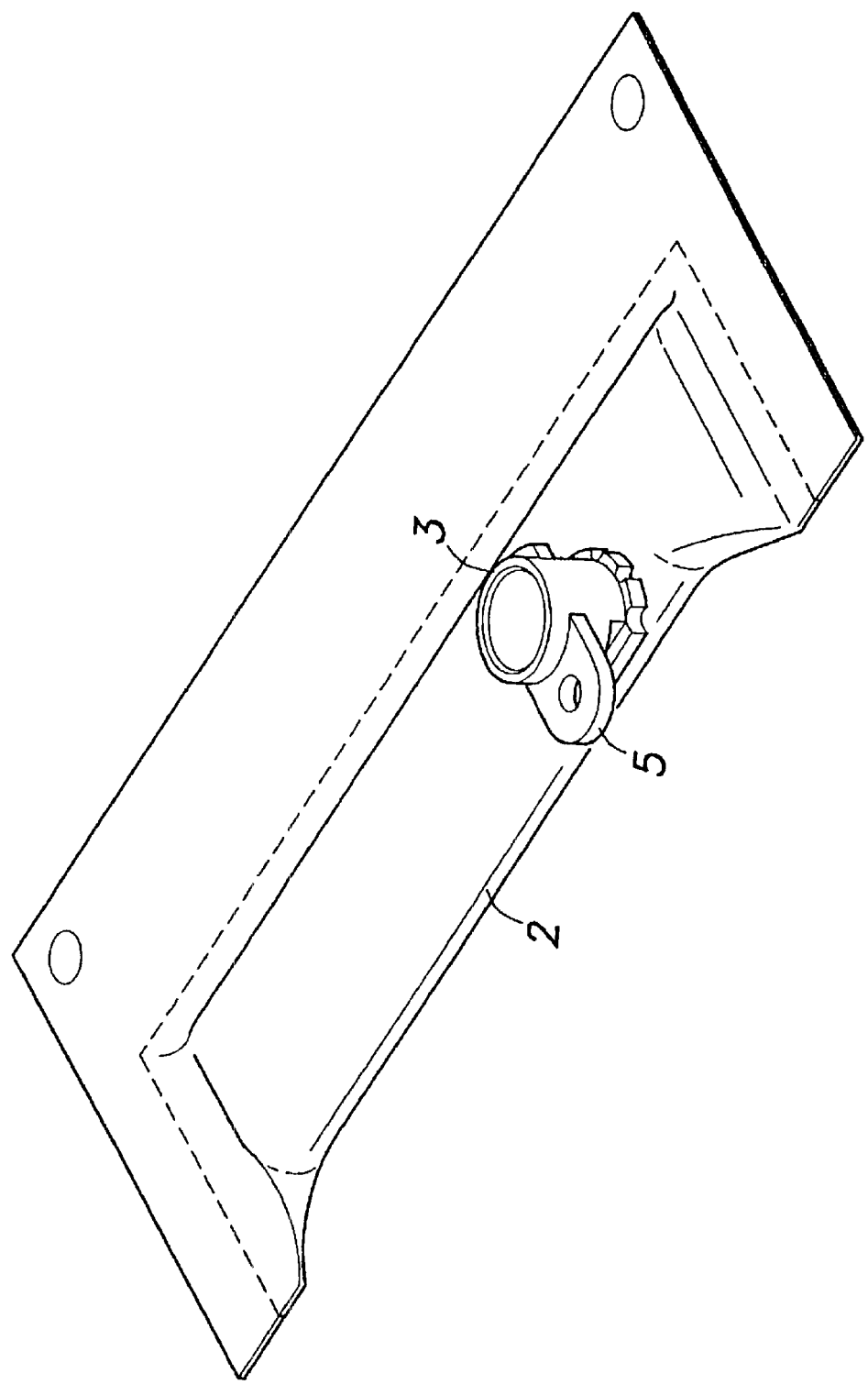
FIG. 9 is an explanatory view showing a third stage of the assembling procedures of the filtering device according to the invention.

Next, as shown in FIG. 8, the mesh member M is folded over to wrap therein the elastic shape holder 4, and under the state, three opening ends thereof are heat welded, as shown in FIG. 9. Thereafter, by removing the circumferential edge portions along dotted lines shown in FIG. 9, the filtering device 1 is completed as shown in FIGS. 1 through 5.

Figure 10:
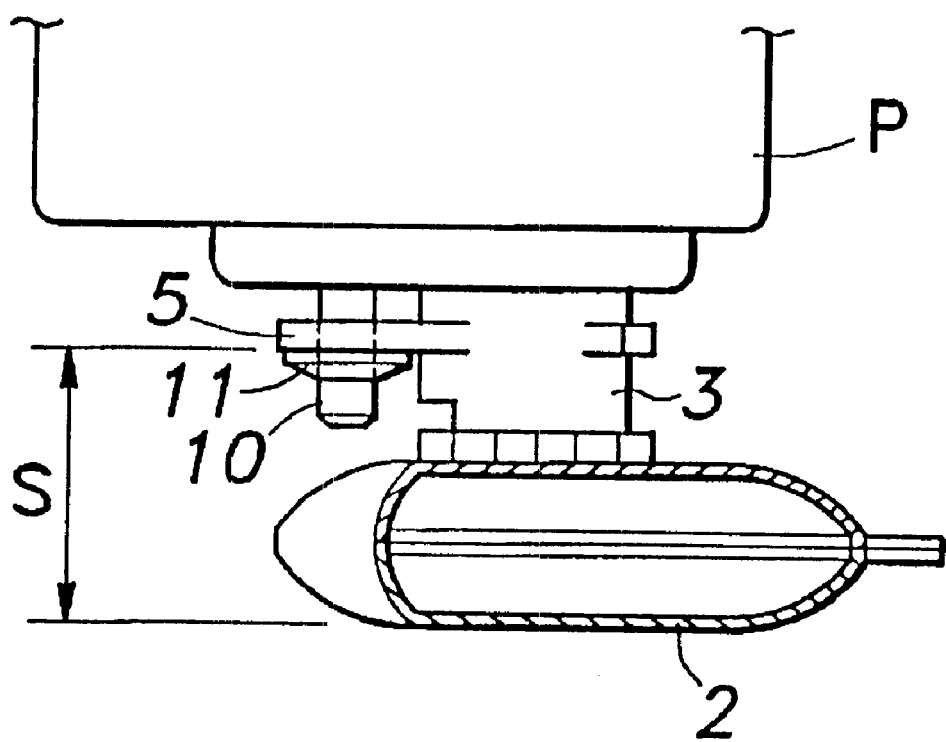
FIG. 10 is a perspective view showing a state wherein the filtering device of the invention is attached to a pump.

As shown in FIG. 10, the pump connecting port 3 is provided at one side edge of the folded bag member 2 to be projected. Therefore, when the suction port of the pump P is connected to the pump connecting port 3, a space S under the flange 5 for connecting the positioning pin 10 provided at the pump P extending to a bottom surface of the bag member 2 can be used. Therefore, the total dimension can be reduced even after an inserting space for inserting a jig, for attaching a toothed lock washer 11, into a forward end of the positioning pin 10 is formed.

As described above, according to the present invention, the dimension when the pump is connected can be further reduced and, at the same time, the production equipment can be greatly simplified.

While the invention has been explained with reference to the specific embodiment of the invention, the explanation is illustrative and the invention is limited only by the appended claims.

What is claimed is:

1. A filtering device comprising, a bag member formed of a mesh member and having a flat form with upper and lower surfaces and side edges, and a connecting port to be connected to a suction port of a pump, said connecting port being fixed to the upper surface of the bag member to project upwardly therefrom and having a flange for positioning the pump disposed at a position away from the bag member and extending laterally outwardly from the connecting port, said connecting port being positioned at one of the side edges of the bag member so that the flange is substantially located at a side away from the bag member.

2. A filtering device as claimed in claim 1, further comprising a shape holder for holding a shape of the bag member provided inside the bag member having a first engaging portion, and a shape holder fixing portion integrally formed with the connecting port inside the bag member having a second engaging portion engaging the first engaging portion.

3. A filtering device as claimed in claim 2, wherein said first engaging portion is formed of a plurality of projections or holes, and the second engaging portion is formed of a plurality of holes or projections press-in fitting with the projections or holes of the first engaging portion.

4. A filtering device as claimed in claim 3, wherein said mesh member and connecting port are integrally connected by an insert molding, and three side edges of the mesh member are welded after the shape holder is connected to the connecting port and the mesh member is folded to wrap the shape holder.

5. A filtering device as claimed in claim 2, wherein said shape holder in the bag member extends in one direction from the connecting port, and the flange extends in a direction substantially perpendicular to the shape holder to be located laterally outside the bag member.

* * * * *